United States Patent
Horne et al.

(10) Patent No.: US 7,133,440 B1
(45) Date of Patent: Nov. 7, 2006

(54) ACQUISITION OF A SYNCHRONOUS CDMA TDD QPSK WAVEFORM USING VARIABLE THRESHOLDS FOR PN AND BURST SYNCHRONIZATION

(75) Inventors: Lyman D. Horne, Salt Lake City, UT (US); Delon Jones, West Bountiful, UT (US); Samuel Kingston, Salt Lake City, UT (US); Steven Perkins, Sandy, UT (US)

(73) Assignee: L-3 Communications Corporation, New York, NY (US)

( * ) Notice: Subject to any disclaimer, the term of this patent is extended or adjusted under 35 U.S.C. 154(b) by 746 days.

(21) Appl. No.: 10/280,167

(22) Filed: Oct. 25, 2002

(51) Int. Cl.
*H04B 1/69* (2006.01)
*H04B 7/216* (2006.01)

(52) U.S. Cl. .................. 375/150; 375/149; 370/335

(58) Field of Classification Search ........... 375/130, 375/140, 141, 146, 147, 142, 145, 149, 279–281, 375/362–368, 329, 316, 332, 144, 150; 370/335, 370/342, 441; 329/304, 306; 332/103
See application file for complete search history.

(56) References Cited

U.S. PATENT DOCUMENTS

| | | | |
|---|---|---|---|
| 4,638,494 A | 1/1987 | Kartchner et al. | 375/2.2 |
| 5,177,765 A | 1/1993 | Holland et al. | 375/1 |
| 5,313,491 A | 5/1994 | Schramm et al. | 375/1 |
| 5,440,597 A | 8/1995 | Chung et al. | 375/200 |
| 5,642,377 A | 6/1997 | Chung et al. | 375/200 |
| 5,748,687 A | 5/1998 | Ozluturk | 375/367 |
| 5,805,584 A | 9/1998 | Kingston et al. | 370/342 |
| 5,903,551 A | 5/1999 | Kingston et al. | 370/335 |
| 6,483,867 B1 * | 11/2002 | Mannermaa | 375/149 |
| 6,580,750 B1 * | 6/2003 | Aue | 375/150 |
| 6,603,735 B1 * | 8/2003 | Park et al. | 370/208 |
| 6,822,999 B1 * | 11/2004 | Lee et al. | 375/145 |

OTHER PUBLICATIONS

Luecke, "Comparison of Detection Schemes for Fast Acquisition Direct-Sequence Spread Spectrum Receiver" IEEE, 1989, pp. 865-869.*

* cited by examiner

*Primary Examiner*—Tesfaldet Bocure
(74) *Attorney, Agent, or Firm*—Harrington & Smith,LLP (57) ABSTRACT

A method and system for open-loop acquisition of a pseudo-noise (PN) encoded QPSK burst signal is provided. The method includes the steps of determining a PN correlation accumulation (PNCA) threshold and a sync threshold. Searching for a burst signal synchronization by searching a burst preamble for a sync word exceeding the sync threshold. In response to detecting the sync word, performing a PNCA of at least 256 bits following the detected sync word and comparing the PNCA of the at least 256 bits with the PNCA threshold. The comparison further includes the step of verifying that the PNCA of the 256 bits following the detected sync word exceeds the PNCA threshold and then verifying sync word detection. Next, using the burst preamble an estimate of carrier signal frequency is determined; and using a subsequent burst preamble carrier signal frequency and carrier signal phase is determined.

25 Claims, 11 Drawing Sheets

SYNC LEVEL
FIG.6

ACQUISITION OF A SYNCHRONOUS CDMA TDD QPSK WAVEFORM USING VARIABLE THRESHOLDS FOR PN AND BURST SYNCHRONIZATION

BACKGROUND OF THE INVENTION

1. Field of the Invention

The present invention relates to spread spectrum communication systems using PN coding techniques and, more particularly, to acquiring a phase of the PN code.

2. Prior Art

Spread spectrum (SS) systems, which may be CDMA systems, are well known in the art. SS systems can employ a transmission technique in which a pseudo-noise (PN) PN-code is used as a modulating waveform to spread the signal energy over a bandwidth much greater than the signal information bandwidth. At the receiver the signal is despread using a synchronized replica of the PN-code.

There are, in general, two basic types of SS systems: direct sequence spread spectrum systems (DSSS) and frequency hop spread spectrum systems (FHSS).

The DSSS systems spread the signal over a bandwidth $f_{RF} \pm R_c$, where $f_{RF}$ represents the center bandpass carrier frequency and $R_c$ represents the PN-code maximum chip rate, which in turn is an integer multiple of the symbol rate $R_s$. Multiple access systems employ DSSS techniques when transmitting multiple channels over the same frequency bandwidth to multiple receivers, each receiver having its own designated PN-code. Although each receiver receives the entire frequency bandwidth only the signal with the receiver's matching PN-code will appear intelligible, the rest appears as noise that is easily filtered. These systems are well known in the art and need not be discussed further. As noted, the DSSS system PN-code sequence spreads the data signal over the available bandwidth such that the carrier appears to be noise-like and random to a receiver not using the same PN-code.

In communication systems having multiple central base stations or network access points (AP) and multiple subscriber units or consumer premise equipment (CPE), e.g., fixed or mobile units, the CPE may receive and decode signals transmitted by each of the APs. It will be appreciated that in burst communication systems it is desirable to provide a method and system to quickly determine the strongest or desirable transmitting station; and to quickly open-loop synchronize with a forward burst signal communicated by the transmitting station.

SUMMARY OF THE INVENTION

The foregoing and other problems are overcome, and other advantages are realized, in accordance with the presently preferred embodiments of these teachings. In accordance with the teachings of the invention presented herein, the forward acquisition of a signal from the AP to a CPE is accomplished by using variable thresholds for PN and burst synchronization.

In accordance with one embodiment of the present invention a method for forward frame acquisition of a CDMA carrier signal is provided. The method includes steps of providing a receiver device having at least receiver antenna; providing a calibration routine that establishes a threshold energy level in an immediate channel environment; and in response to receiving at least one pseudo-noise (PN) encoded burst signal having energy content above the threshold level, and identifying at least one receiver antenna receiving the PN encoded burst signal. The invention further includes executing the step of parallel correlating the PN encoded burst signal with at least one known PN code during one of at least three equally spaced accumulation periods associated with the PN encoded burst. The next step synchronizes frame timing with the PN encoded burst signal having energy content above the predetermined level.

In accordance with another embodiment of the present invention an apparatus for forward acquisition of at least one CDMA waveform is provided. The apparatus includes a receiver device having at least one receiver antenna for receiving at least one CDMA waveform; and at least one correlator for correlation of the at least one CDMA waveform during one of at least three equally spaced accumulation periods associated with the at least one CDMA waveform. The apparatus also includes means for determining if the CDMA waveform energy content is above a predetermined level; and a frame synchronizer for synchronizing with the at least one CDMA waveform.

The invention is also directed towards a system for forward acquisition of a CDMA waveform. The system includes at least one transmitter for transmitting at least one CDMA waveform associated with a unique PN code; and a receiver for receiving the at least one CDMA waveform. The receiver includes at least one receiver antenna adapted to receive the CDMA waveform. The receiver also includes a pseudo-noise (PN) correlation accumulator (PNCA) controller for determining at least one PNCA threshold from the at least one CDMA waveform; a sync controller for determining at least one sync threshold and searching for a first burst sync using the at least one PNCA threshold and the at least one sync threshold; a frequency tracking loop for finding a first signal frequency estimate of the at least one CDMA waveform in response to finding the first burst sync; and a phase tracking loop for determining signal phase from a second burst, wherein the first signal frequency estimate can be utilized during the preamble of the second burst to provide close frequency alignment and allow time for the phase tracking loop to close during the preamble.

In another embodiment of the invention a method for acquisition of a pseudo-noise (PN) encoded QPSK burst signal is provided. The method includes the steps of determining a PN correlation accumulation (PNCA) threshold and determining a sync threshold. The next step searches for a burst signal synchronization which includes the steps of searching a burst preamble for a sync word exceeding the sync threshold; and, in response to detecting the sync word, performing a PNCA of 256 bits following the detected sync word. The next step compares the PNCA of the 256 bits with the PNCA threshold, and in response to the PNCA of the 256 bits exceeding the PNCA threshold, verifying the PNCA of the 256 bits following the detected sync word exceeds the PNCA threshold and then verifying sync word detection. The last steps use the burst preamble to estimate carrier signal frequency and a subsequent burst preamble to determine carrier signal frequency and signal phase.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
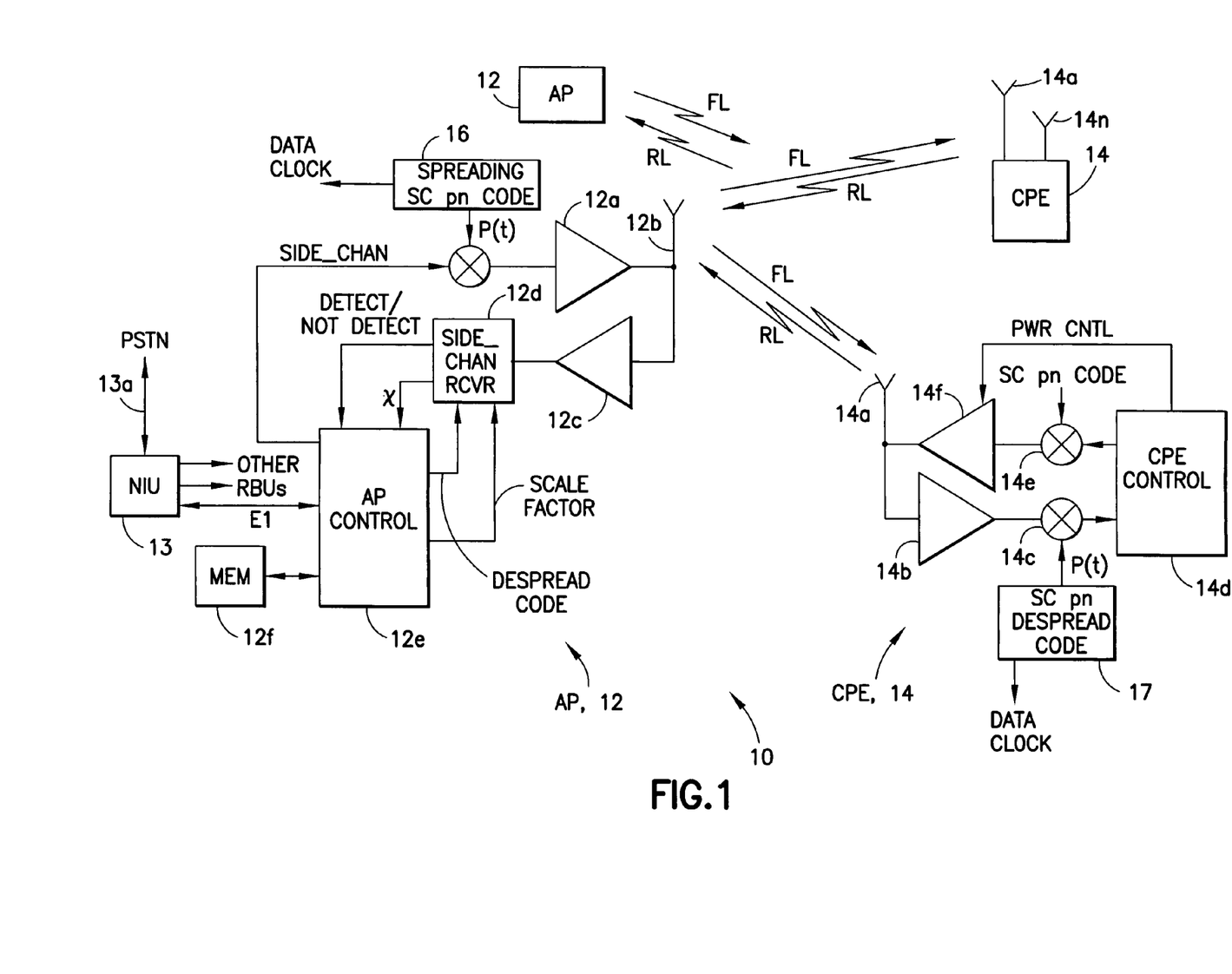
FIG. 1 is a block diagram of a communications system incorporating features of the present invention.

Referring to FIG. 1, there is shown a pictorial diagram of a multi-user telecommunications system incorporating features of the present invention. Although the present invention will be described with reference to the embodiment shown in the drawings, it should be understood that the present invention might be embodied in many alternate forms of embodiments.

Still referring to FIG. 1 there is shown a Fixed Wireless System (FWS) 10 that is suitable for practicing this invention. Specifically, the FWS 10 employs direct sequence spread spectrum based CDMA techniques over an air link to provide local access to subscribers, and offers very high quality, highly reliable service. The FWS 10 is a synchronous CDMA (S-CDMA) communications system wherein forward link (FL) transmissions from a base station, referred to also as an access point (AP) 12, for a plurality of transceiver units, referred to herein as user or consumer premise equipment (CPE) 14, which may be symbol and chip aligned in time, and wherein the CPE 14 operates to receive on at least one, but more preferably on one of at least two, antennas 14a the FL transmissions and to synchronize to one of the transmissions. It will be appreciated that for clarity only one antenna is shown in the detailed block diagram in FIG. 1 but it is to be understood that at least two receiver antennas are in the CPE as shown in the high level single CPE block 14 shown in FIG. 1. While not necessary for the present invention, each CPE 14 may also transmit a signal on a reverse link (RL) to AP 12 to generally perform bi-directional communications. The FWS 10 is suitable for use in implementing a telecommunications system that conveys multirate voice and/or data between the AP 12 and the CPEs 14.

The AP 12, includes circuitry for generating a plurality of user signals ($USER_1$ to $USER_n$), which are not shown in FIG. 1, and a synchronous side channel ($SIDE_{chan}$) signal that is continuously transmitted. Each of these signals is assigned a respective PN spreading code and is modulated therewith before being applied to a transmitter 12a having an antenna 12b. In the preferred embodiment there is at least one antenna for every AP sector. When transmitted on the FL the transmissions are modulated in phase quadrature, and the CPEs 14 are assumed to include suitable phase demodulators for deriving in-phase (I) and quadrature (Q) components there from. The AP 12 is capable of transmitting a plurality of CDMA channels.

Figure 2:
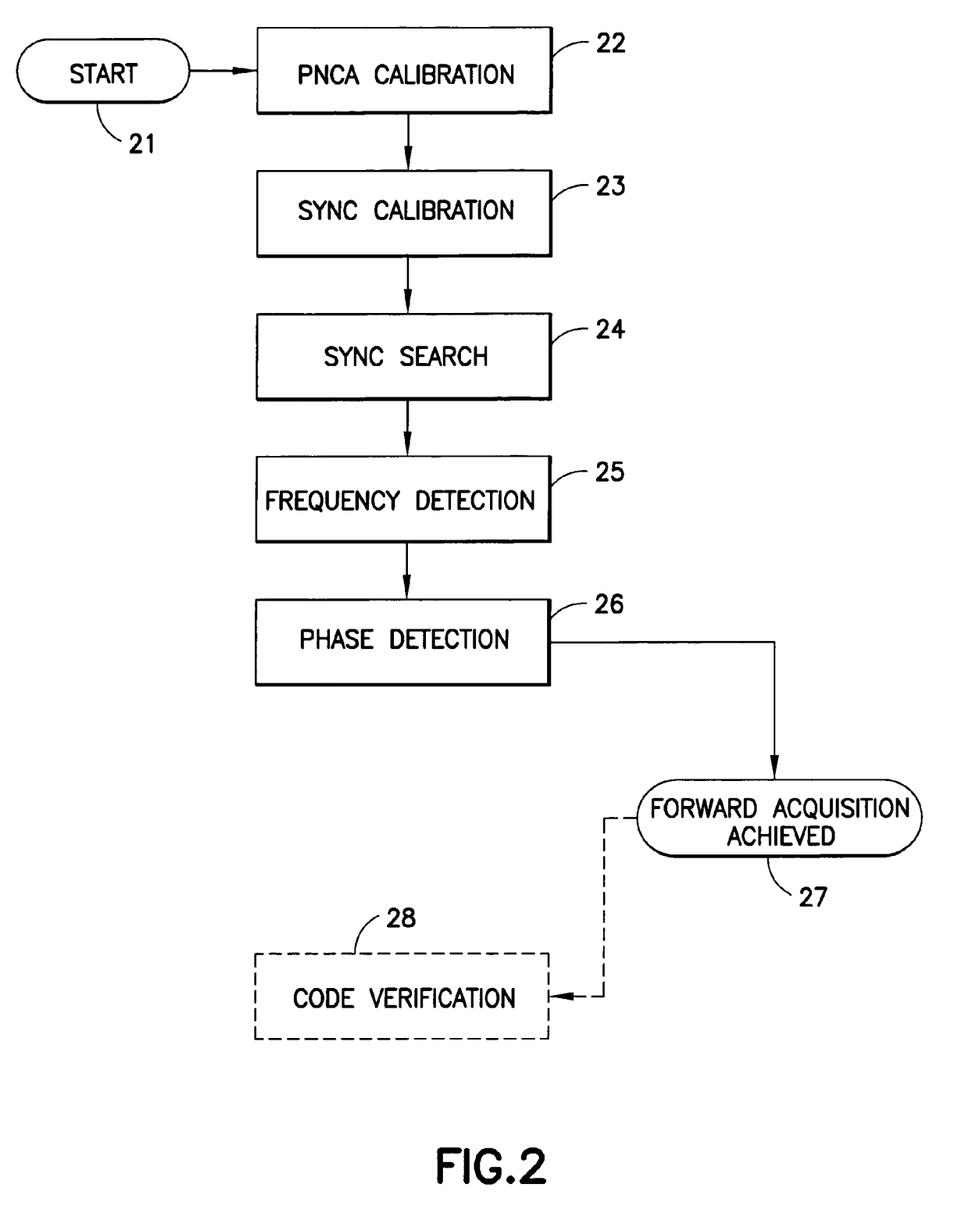
FIG. 2 is a method flow chart illustrating the steps for implementing one embodiment of the present invention.

The AP 12 also includes a receiver 12c having an output coupled to a side channel receiver 12d. The side channel receiver 12d receives as inputs the spread signal from the receiver 12c, a scale factor signal, and a side channel despread PN code. These latter two signals are sourced from a AP processor or controller 12e. The scale factor signal can be fixed, or can be made adaptive as a function of the number of CPEs 14 that are transmitting on the reverse channel. The side channel receiver 12d outputs a detect/not detect signal to the AP controller 12e for indicating a detection or forward acquisition of a transmission from one of the CPEs 14, and may also generate a power estimate value. Referring to FIG. 2, in accordance with the present invention, forward acquisition includes the steps of PN correlation accumulator (PNCA) calibration, step 22. PNCA calibration identifies an antenna (FIG. 1, item 14a) and forward sync code (FSC) combination with energy above a predetermined threshold to be used throughout the forward signal acquisition, adjusts PNCA scale factors, and calculates a PNCA threshold required for sync search. In addition, PNCA calibration, step 22, determines an initial sync scale factor to be used in sync calibration. A variable length list of PN codes to be searched is preferably provided before PNCA calibration. This list of PN codes is searched, and the code with the energy above a predetermined level may be used for the remainder of forward acquisition. The length of the code list can be as small as 1 and, in alternate embodiments, as large as, for example, 57, or the total number of FSCs. In the preferred embodiment, the length of the list will be 1.

Sync calibration, step 23, adjusts the initial sync scale factor and calculates a sync threshold required for sync search, step 24. Sync search 24 aligns the CPE burst timing with the received signal using embedded sync bits and verifies it with the PNCA threshold (see FIG. 5). After burst timing is determined, frequency detection, step 25, estimates In Phase (I) and Quadrature phase (Q) rotation rate. Phase detection, step 26 then determines I-Q phase error. In alternate embodiments, code detection and verification, step 28, may be used to verify forward acquisition. In the alternate embodiment, forward acquisition is verified by decoding a forward error correction coded sync code (FEC). In the preferred embodiment the FEC code used is the Reed Solomon FEC.

Figure 4:
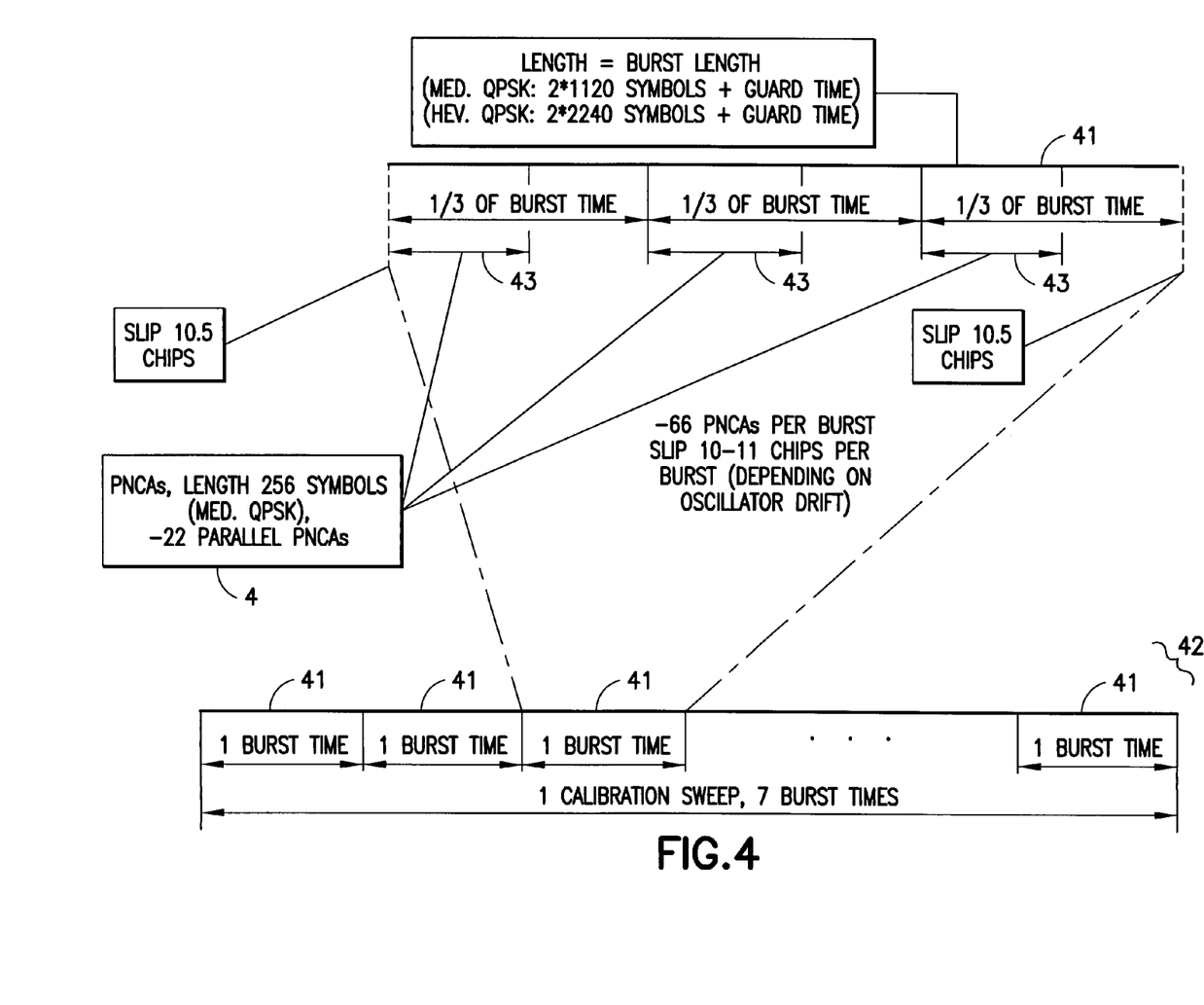
FIG. 4 is a pictorial diagram of a waveform incorporating features of the present invention.
Figure 4A:
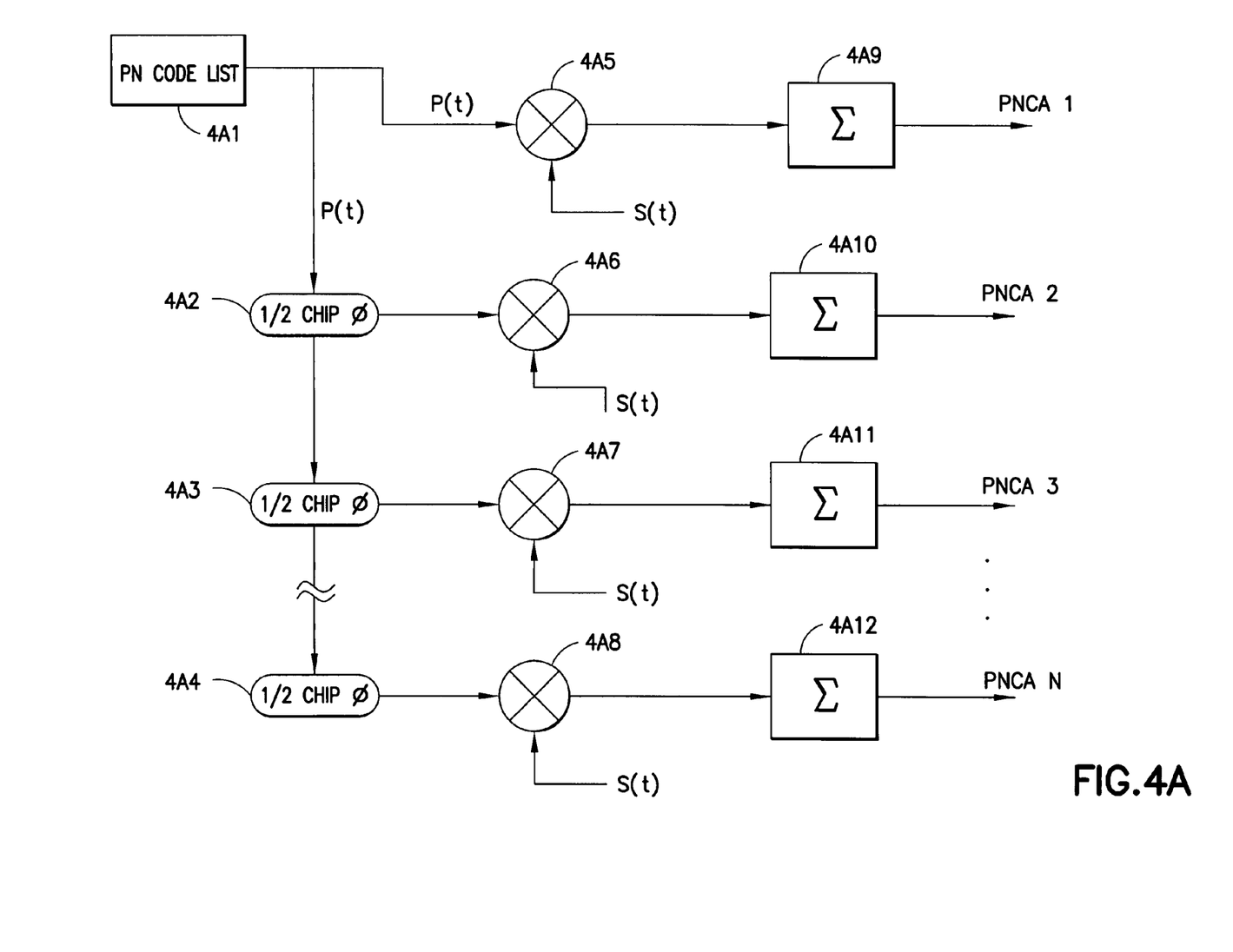
FIG. 4A is a block diagram of a N-length parallel PN correlation accumulator.

Referring to FIG. 4A, the PNCA calibration routine sweeps the entire uncertainty one code at a time from PN code list 4A1 using parallel accumulation correlators $PNCA_1 \ldots PNCA_N$; in a preferred embodiment, N=21. The signal s(t) is mixed with PN code p(t) in mixers 4A5–4A8, and accumulated in accumulators 4A9–4A12. Each successive mix and accumulation is phase delayed ½ chip by phase delayers 4A2–4A4. Thus, the signal s(t) uncertainty is swept by recording PNCAs at one PN phase alignment spanning 10 chips in a length 21 parallel correlator, then slipping 10 chips before recording more PNCAs. It will be appreciated that alternate embodiments may use any suitable parallel length correlator. This process continues until the entire signal s(t) uncertainty is swept.

For example, in a preferred embodiment, the PN code is slipped a number of half chip slips equal to the parallel length of the correlators $PNCA_1$–$PNCA_N$ minus the uncertainty that may be slipped due to oscillator drift. The oscillator (not shown) may have an overall uncertainty of ±3.5 PPM, so that 1 chip may be slipped due to oscillator drift every 285,714 chips, or ½ chip every 142857 chips, or ~2.2 ms at 66 Mcps, approximately one burst time in a preferred embodiment. Thus, the PN code is slipped 20 half chip slips (10 chips) each burst. Due to the oscillator drift, the PN code will slip between 9.5 and 10.5 chips per burst. The code uncertainty, in the preferred embodiment, is 64 chips, therefore, as shown in FIG. 4, PNCAs over 7 burst times 42 are collected to sweep the entire uncertainty. In addition, since the timing with respect to the AP 12 is unknown, during each burst time 3 equally spaced PNCAs 43 of sufficiently short length are used. This ensures that at least one of the PNCA times is completely contained within the receive time, independent of the burst timing phase.

During a PNCA calibration sweep, the PNCA scale factors are used and the PNCA scale factors are adjusted so that the highest energy signal falls within a window after scaling. The sync circuit (discussed below) is operated with the scale factors under microprocessor control (not shown) and initially set to PNCA scale factors. If at any time a PNCA is recorded with energy above the window, the PNCA scale factors are re-adjusted and the calibration sweep for that code is restarted. If, after the sweep has completed, the PNCA of largest energy is below the window, the scale factors are readjusted and the sweep is repeated.

When a calibration sweep is complete, the peak and second largest PNCAs are used to calculate the sync and PNCA thresholds that are required by the sync search.

Figure 5:
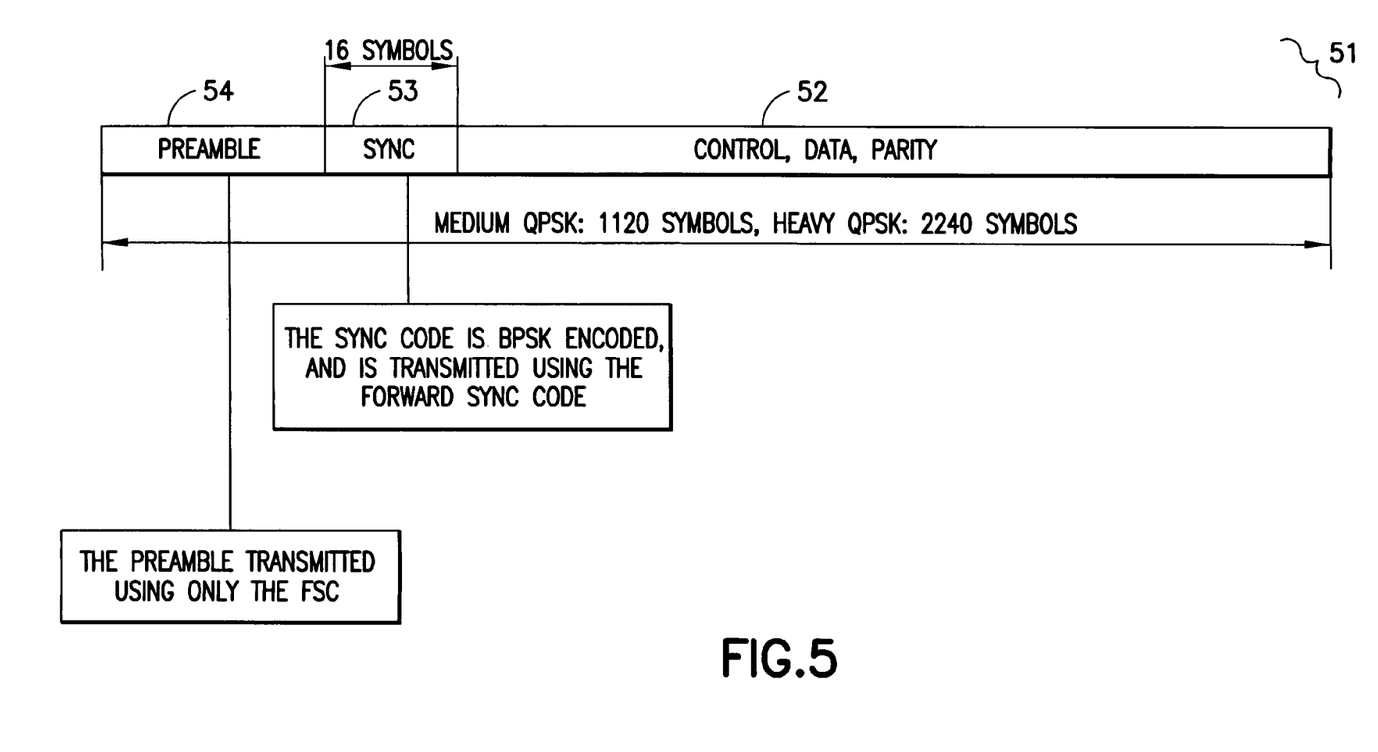
FIG. 5 is a pictorial diagram of a burst structure incorporating features of the present invention shown in FIG. 1.

Referring to FIG. 5, sync calibration adjusts the sync scale factors and calculates the sync threshold required for sync search for a Binary Phase Shift Keying (BPSK) encoded sync pattern 53 embedded in the burst signal 51, immediately following the preamble 54. It will be appreciated that the sync pattern 53, sixteen symbols in the preferred embodiment, is transmitted using only the FSC. In alternate embodiments the sync pattern can be any suitable symbol length. It will also be appreciated that the burst signal 51, including the preamble 54, the sync pattern 53, and the control, data, parity information 52 may be 1120 symbols in one embodiment or 2240 in an alternate embodiment. It will be further appreciated that the symbol length of the burst signal may be any suitable symbol length. Sync search for the sync pattern 53 preferably uses the combination of antenna and FSC determined during PNCA calibration.

Figure 6:
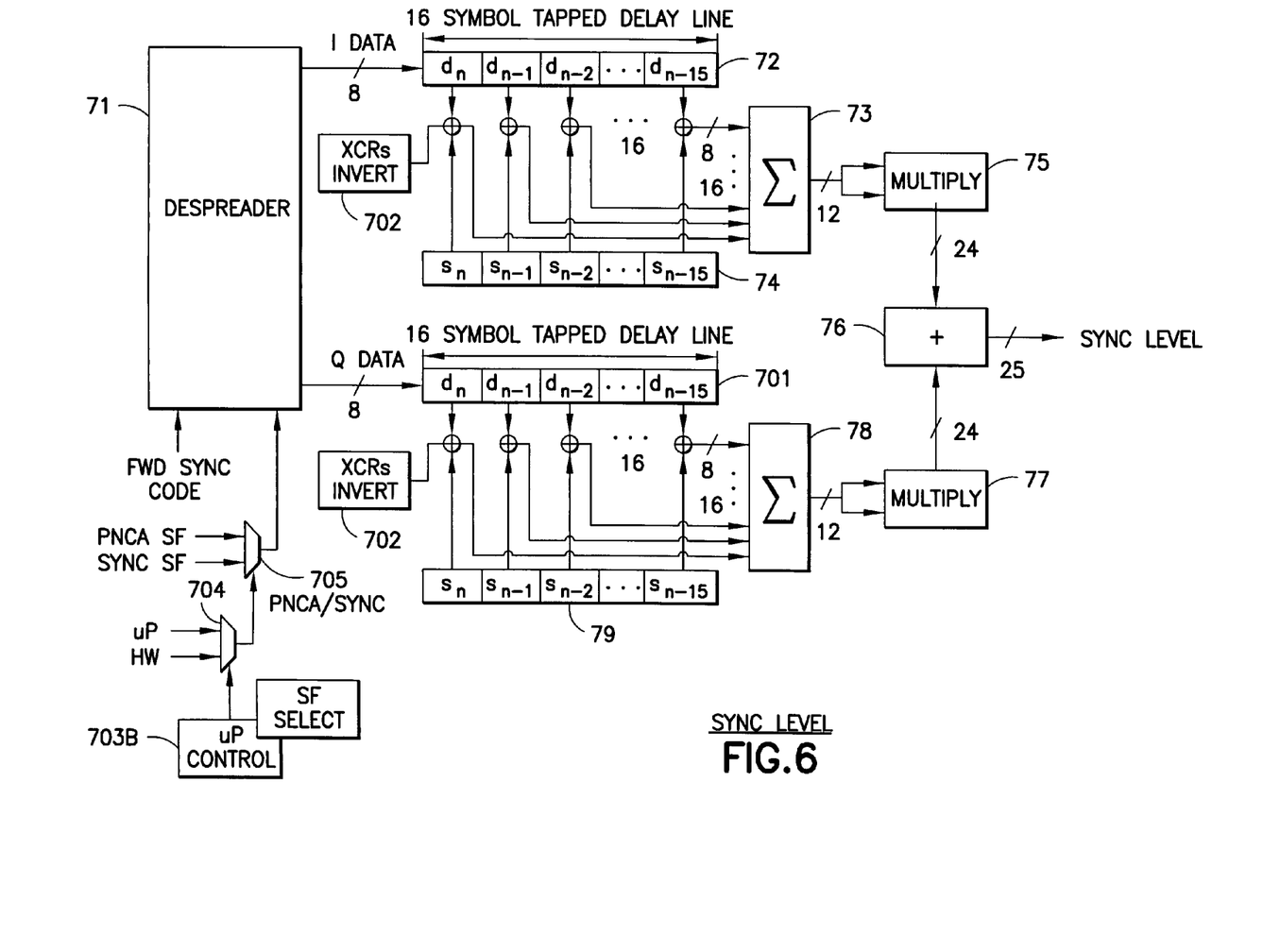
FIG. 6 is a block diagram of a sync level detection circuit incorporating features of the present invention shown in FIG. 1.

A sync level circuit, such as shown in FIG. 6, is used to determine sync code alignment. For each symbol time for the I and Q signals from despreader 71, the sync code data $s_n$–$s_{n-15}$ is removed from the previous 16 symbols by 16 symbol tapped delay lines 72,74,701,79, respectively, through XOR gates 702. The soft decision data for these I and Q symbols is accumulated in accumulators 73 and 78, respectively. The accumulator values are then squared and summed by multipliers 75,77 and summer 76, to produce the sync level output. During sync calibration, the scale factors are under microprocessor control, item 703, and set to sync scale factors. An initial value for the sync scale factors is determined from the PNCA calibration.

The sync uncertainty is swept by slipping 1 chip per burst. This causes a slip of between ½ and 1½ chips per burst since the oscillator drift may be close to ½ chip per burst in either direction. In a preferred embodiment, at least 3 parallel sync level circuits (not shown), phased spaced ½ chip apart, spanning 1½ *chips*, may be used to determine sync *levels*. It will be appreciated that parallel searching over at least 1½ chips compensates for the case that the oscillator may drift in the same direction as the slip.

In general, the frequency of the slipping is the burst length plus the sync word length (in a preferred embodiment: 1120 symbols+16 symbols). The sync level circuitry is enabled so that the maximum sync level is determined. This level is then used to adjust the sync scale factors used in sync search (described below) and to determine the sync threshold for sync search.

Figure 7:
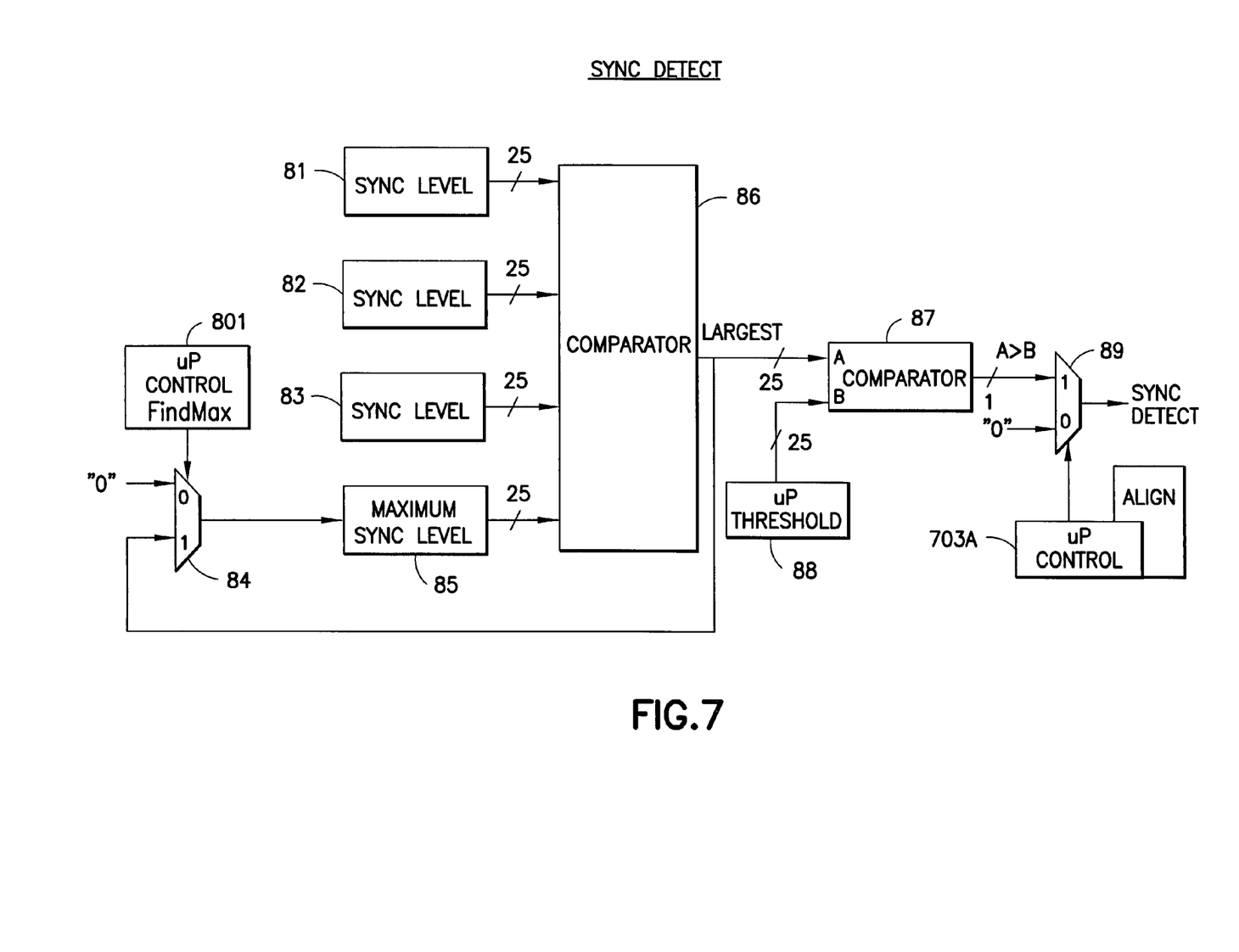
FIG. 7 is a block diagram of a sync detect circuit incorporating features of the present invention shown in FIG. 1.

Sync search aligns the burst timing to the received signal. During sync search, the FIND MAX control (FIG. 7, item 801) is reset so that the maximum sync level is not used. The ALIGN signal 703A is set so that the hardware aligns the burst timing if the sync level exceeds the threshold. The scale factor select (FIG. 6, item 703B) is set to HW control. Sync scale factors are preferably used during the sync search, and the HW preferably switches to PNCA scale factors during the PNCA that follows when sync detect occurs.

Figure 8:
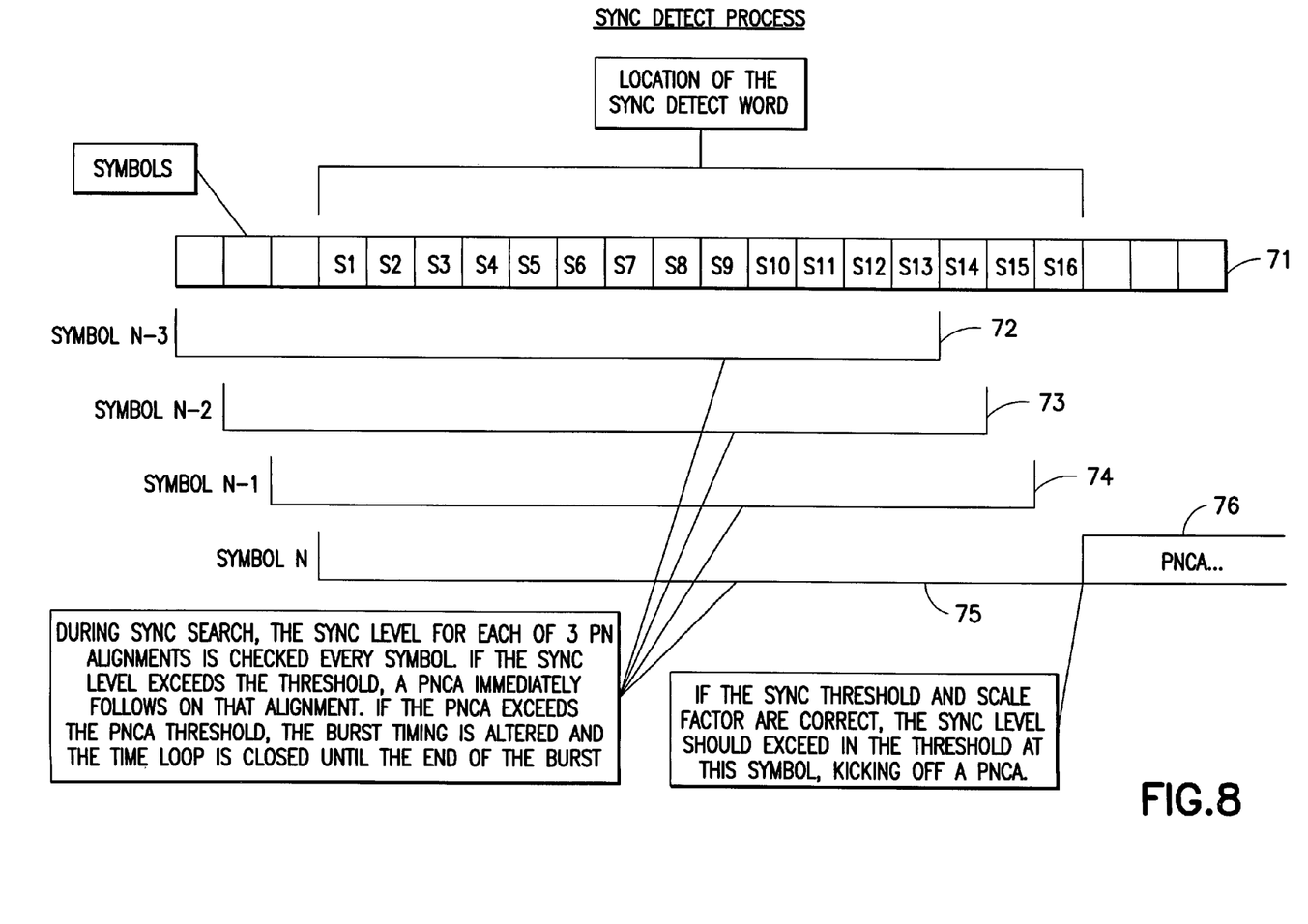
FIG. 8 is a pictorial diagram illustrating the location of a sync detect word and the process for detecting the sync detect word shown in FIG. 5.

In a presently preferred embodiment, during sync search PN timing is slipped 1 chip per burst+16 symbols, as in sync calibration. Referring to FIG. 8, the sync level for each of the three PN alignments, space ½ chip apart, is checked every symbol for the 16 symbol sync word (only three symbol slips are shown, 72,73,74). When the sync search level exceeds the sync calibration level or threshold, the sync word 75 is detected and a length 256 PNCA follows (see FIG. 8, item 76). If this PNCA exceeds the PNCA threshold determined during PNCA calibration, the time loop is closed and the burst timing is adjusted and carrier signal frequency detection begins. In a preferred embodiment, following bursts are used to check that the sync exceeds the threshold 3 out of 5 times. If the PNCA does not exceed the threshold, the sync search continues with another burst+16 symbols without slipping.

Frequency detection estimates the I-Q rotation rate using the preamble of the detected FSC. This frequency estimate is loaded into the carrier recovery loop. Initial frequency detection estimates the I-Q rotation rate using the rest of the burst after sync detect. This is done by closing the frequency tracking loop for the rest of the burst. The frequency estimate is taken at the end of the burst and the loop is opened. This frequency estimate is loaded into the carrier recovery loop and used as the preamble of the next burst start. Because of this frequency estimate, the frequency loop will converge within a few symbols from the start of the preamble ensuring adequate time for the phase detector to converge before the preamble end.

Phase detection estimates the I-Q phase error using the preamble of the detected FSC. This is done by closing the phase tracking loop as the frequency tracking loop converges. In general, no phase data is saved from the previous burst because of channel and reference oscillator variability, therefore time for a complete phase detect is preferably allowed. In the preferred embodiment, this is possible because the frequency tracking loop has a close frequency estimate from the previous burst and converges rapidly. Frequency tracking loops and phase detectors are well known and need not be shown or further discussed here.

Verification by the Reed Solomon decode metrics, or by any suitable forward error decoder metrics, may be used to verify the I-Q frequency and phase match to the frequency and phase of the PN code.

Figures 3, 3A:
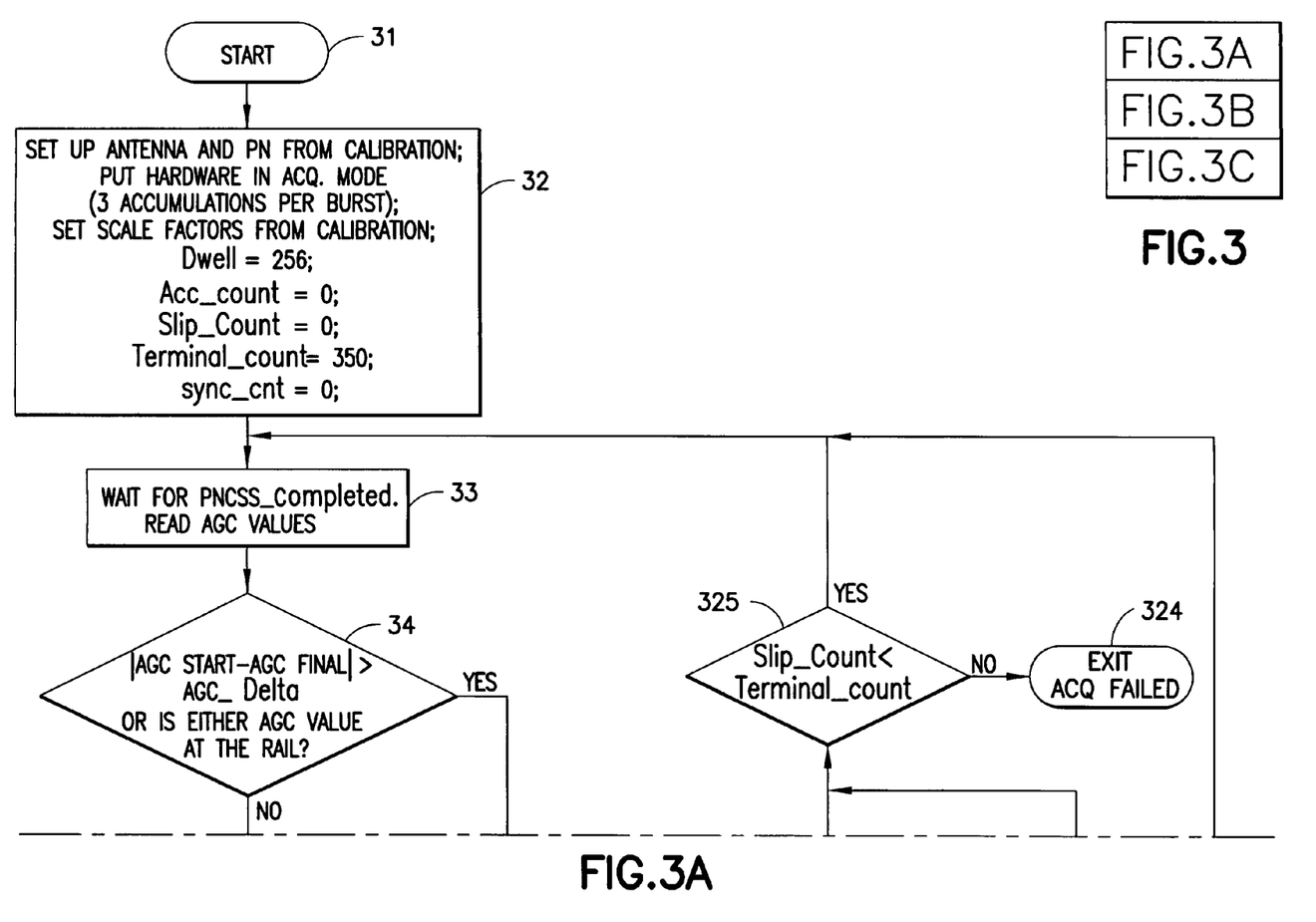
FIGS. 3A, 3B, and 3C, collectively referred to as FIG. 3, show a detailed method flow chart illustrating steps for implementing another embodiment of the present invention.
Figure 3B:
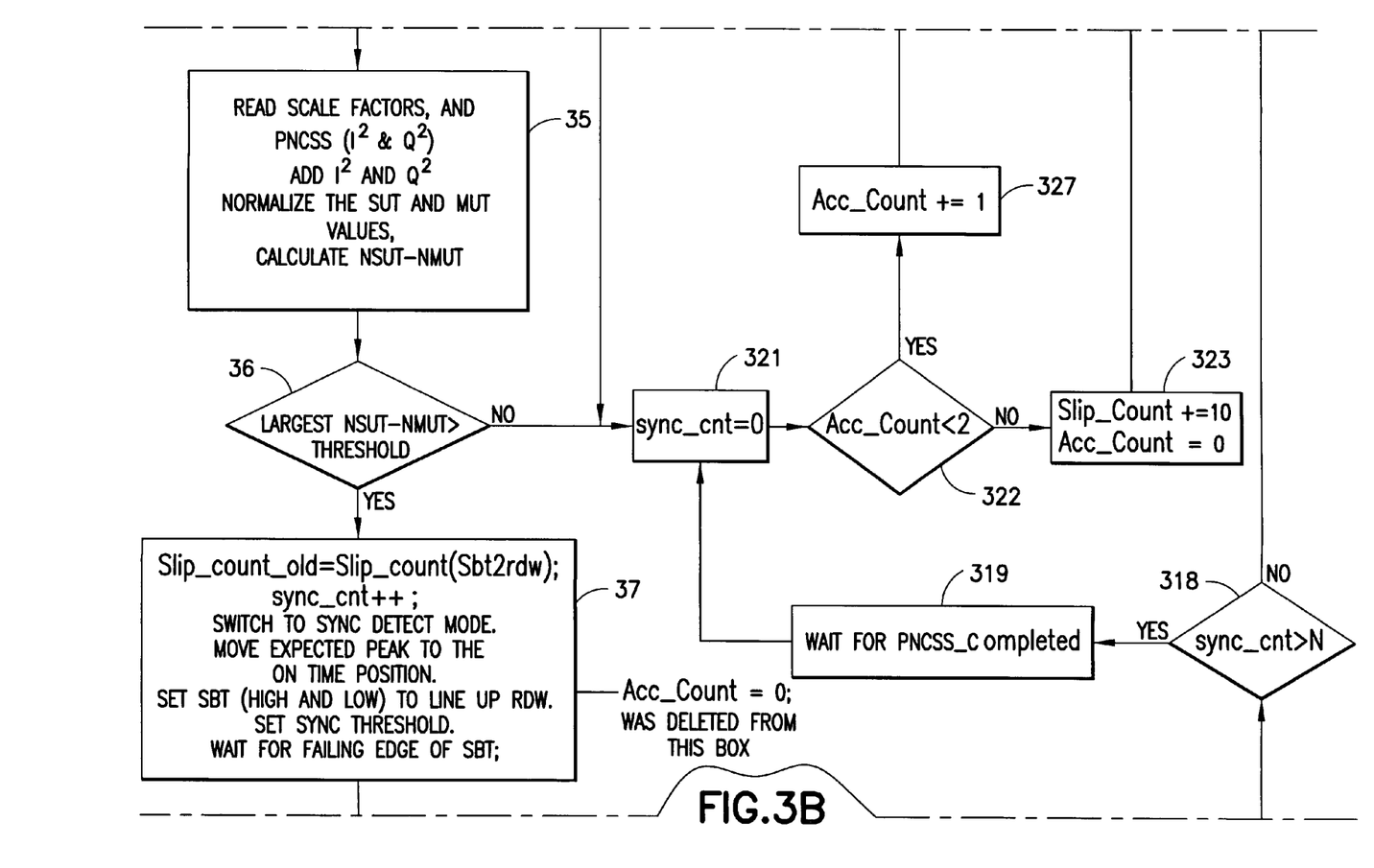
Figure 3C:
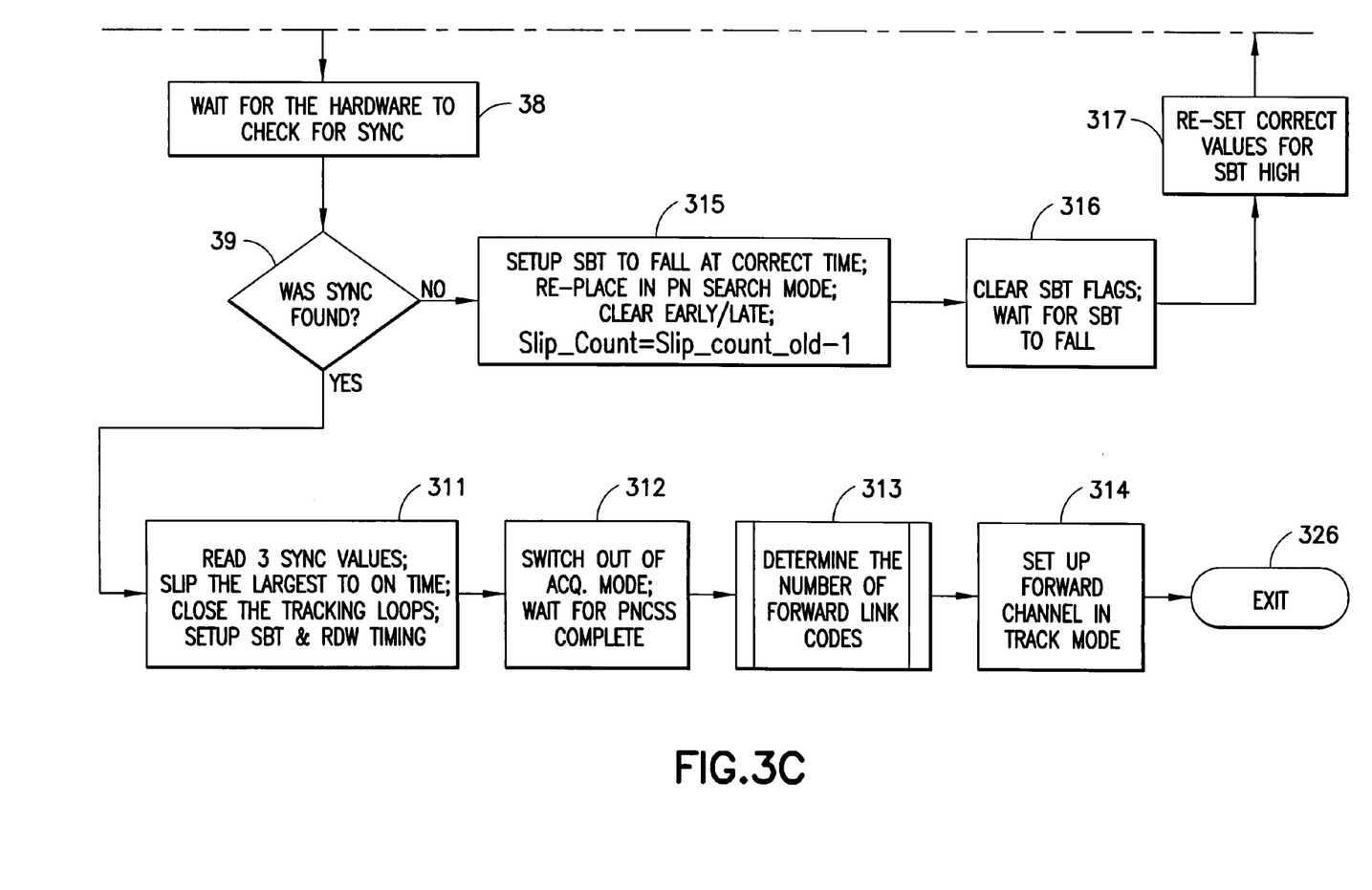

Referring now to FIG. 3 there is shown a method flow chart illustrating steps for signal acquisition in accordance with one embodiment of the present invention. Step 31 initializes any pre-acquisition steps that may be necessary, e.g., power on. Step 32 sets up antenna and PN code determined during PNCA calibration. Step 32 also puts the hardware into acquisition mode, e.g., 3 PNCA accumulations per burst and sets PNCA scale factors. Step 33 delays for PN correlation sum square (PNCSS) to complete and then reads the automatic gain control (AGC) value. Step 34 determines if the absolute value of AGC-Start minus the AGC-Final is greater than a predetermined AGC-Delta. If affirmative, step 321 sets a sync counter equal to zero and passes control to step 322. Step 322 determines if the accumulation count is less than 2. If affirmative step 327 increments the accumulation count by one and passes control to decision step 325. Decision step 325 determines if slip count is less than terminal count, initially set by step 32. If slip count is not less than terminal count then acquisition has failed and control is passed to step 324. In alternate embodiments, a failed acquisition may be handled by suitable error handling routines. Returning to step 322, if accumulation count is not below two, then step 323 increments slip count by ten and resets the accumulation count to zero. Control is then passed to step 325, discussed previously. Returning to step 34, if the result is negative, then step 35 reads scale factors and squares and sums the I and Q signals. In addition, step 35 also prepares the sync levels and sync threshold. Step 36 then compares the sync level with the sync threshold. If the sync level is below the threshold control is passed to step 321, discussed previously. If the level is above the threshold, control is passed to step 37, which switches to sync detect or sync search mode, Step 38 then waits for hardware to check for sync. If sync is found, step 39 passes control to step 311 where, in the preferred embodiment 3 sync values, ½ chip phase apart are read. The largest value is slipped to on time. Step 311 also closes the frequency tracking loop and the subsequent phase tracking loop, both of which were discussed earlier. Step 312 switches out of acquisition mode and again waits for PNCSS to complete before passing control to optional step 313 to determine the number of forward link codes. Step 314 then sets up the forward channel in track mode and passes control to step 326 for continued receiver operation. Returning to step 39, if sync is not found, steps 315–317 setup SBT to fall at correct time, clear SBT flags, and reset values for SBT high, respectively. Control is then passed to step 318 to determine if the value of sync counter is greater than a predetermined number. If affirmative, then control is passed to previously discussed step 319. If step 318 is negative then control is passed back to step 33, also discussed previously.

It will be appreciated that the above invention description advantageously describes a method an system for open loop forward frame acquisition of a CDMA carrier signal. It will be further appreciated that novel features of the present invention include a receiver device having at least two receiver antennas, and in response to receiving at least one pseudo-noise (PN) encoded burst signal having energy content above a predetermined level, and identifying the signal and receiving antenna for subsequent signal analysis.

Other advantageous features of the invention described above, include parallel correlating the PN encoded burst signal during one of at least three equally spaced accumulation periods associated with the burst period. In addition, after finding a sync frame, the invention described above, advantageously estimates carrier signal frequency in one burst and then uses that estimate in a following burst to quickly track actual carrier signal frequency and phase.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for forward frame acquisition of a CDMA carrier signal, the method comprising the steps of:
    providing a receiver device, wherein the receiver device comprises at least one receiver antenna;
    providing a calibration routine that establishes a threshold energy level in an immediate channel environment;
    in response to receiving at least one first pseudo-noise (PN) encoded burst signal having energy content above the threshold energy level, identifying at least one receiver antenna receiving the at least one first PN encoded burst signal, wherein the step of receiving the at least one first pseudo-noise (PN) encoded burst signal having energy content above a predetermined level further comprises the step of:
    correlating the at least one first PN encoded burst signal with at least one known PN code, wherein the step of correlating further comprises the step of:
    parallel correlating during one of at least three equally spaced accumulation periods associated with the at least one first PN encoded burst signal; and
    frame synchronizing with the at least one first PN encoded burst signal having energy content above the threshold energy level.

2. A method as in claim 1, wherein the step of correlating the at least one first PN encoded burst signal with at least one known PN code further comprises the step of parallel correlating.

3. A method as in claim 2, wherein the step of parallel correlating comprises parallel correlating with a length 21 parallel correlator.

4. A method as in claim 1, wherein the at least one known PN code comprises one of a plurality of PN codes.

5. A method as in claim 1, wherein the step of frame synchronizing with the at least one first PN encoded burst signal further comprises the steps of:
    determining at least one PN correlation accumulator (PNCA) threshold associated with the at least one first PN encoded burst signal;
    determining at least one sync threshold associated with the at least one first PN encoded burst signal;
    using the at least one PNCA threshold and the at least one sync threshold for searching the at least one first PN encoded burst signal, wherein searching the at least one first PN encoded burst signal further comprises the step of searching the at least one first PN encoded burst signal for a first sync frame;
    determining an estimated carrier signal frequency from the at least one first PN encoded burst signal; and
    determining carrier signal phase from at least one second PN encoded burst signal, wherein the at least one second PN encoded burst signal is associated with the at least one first PN encoded burst signal.

6. A method as in claim 5, wherein the at least one second PN encoded burst signal comprises a PN code substantially similar to the PN code encoding the at least one first PN encoded burst signal.

7. A method as in claim 5, wherein the step of determining the estimated carrier signal frequency further comprises the steps of:
    closing a carrier recovery loop in response to finding the first sync frame; and
    at substantial completion of the at least one first PN encoded burst signal, determining from the carrier recovery loop the estimated carrier signal frequency.

8. A method as in claim 7, wherein the step of determining carrier signal phase from the at least one second PN encoded burst signal further comprises the step of modifying a preamble associated with the at least one second PN encoded burst signal to include the estimated carrier signal frequency.

9. A method as in claim 8, wherein the step of determining carrier signal phase from the at least one second PN encoded burst signal further comprises the steps of:
   loading the estimated carrier signal frequency from the preamble associated with the at least one second PN encoded burst signal into the carrier recovery loop;
   starting from the estimated carrier signal frequency, converging the carrier recovery loop frequency with the CDMA signal frequency;
   in response to the carrier recovery loop frequency converging with the CDMA signal frequency closing a phase tracking loop; and
   determining the CDMA signal phase from the phase tracking loop.

10. An apparatus for forward acquisition of at least one CDMA waveform, the apparatus comprising a receiver device comprising at least one receiver antenna for receiving at least one CDMA waveform; a calibrator for establishing a threshold energy level in an immediate channel environment; at least one correlator for correlation of the at least one CDMA waveform during one of at least three equally spaced accumulation periods associated with the at least one CDMA waveform, and for determining if the CDMA waveform energy content is above the threshold energy level; and a frame synchronizer for synchronizing with the at least one CDMA waveform.

11. An apparatus as in claim 10, wherein the at least one correlator comprises at least one parallel correlator.

12. An apparatus as in claim 11, wherein the at least one parallel correlator comprises a length n parallel correlator, where n is greater than one, and where individual ones of the n parallel correlators are separated by a ½ PN chip delay.

13. An apparatus as in claim 10, wherein the at least one correlator further comprises a memory device for the storage of at least one PN code.

14. An apparatus as in claim 13, wherein the memory device for the storage of the at least one PN code further comprises storage for a plurality of PN codes.

15. An apparatus for forward acquisition of at least one CDMA waveform, the apparatus comprising a receiver device comprising at least one receiver antenna for receiving at least one CDMA waveform; a calibrator for establishing a threshold energy level in an immediate channel environment; at least one correlator for correlation of the at least one CDMA waveform during one of at least three equally spaced accumulation periods associated with the at least one CDMA waveform, and for determining if the CDMA waveform energy content is above the threshold energy level; and a frame synchronizer for synchronizing with the at least one CDMA waveform, wherein the frame synchronizer comprises a carrier recovery loop circuit for determining an estimated CDMA waveform frequency of the at least one CDMA waveform; a preamble modifier for modifying a preamble of the at least one CDMA waveform to include the estimated CDMA waveform frequency; and a phase tracking loop for determining a phase of the at least one CDMA waveform, where the phase tracking loop is adapted for loading the estimated CDMA waveform frequency from the modified preamble.

16. A system for forward acquisition of a CDMA waveform, the system comprising:
   at least one transmitter for transmitting at least one CDMA waveform, wherein each transmitted CDMA waveform is associated with a unique PN code;
   a receiver for receiving the at least one CDMA waveform, the receiver comprising at least one receiver antenna adapted to receive the at least one CDMA waveform;
   a pseudo-noise (PN) correlation accumulator (PNCA) controller for determining at least one PNCA threshold from the at least one CDMA waveform;
   a sync controller for determining at least one sync threshold and searching for a first burst sync using the at least one PNCA threshold and the at least one sync threshold;
   a frequency tracking loop for finding a first signal frequency estimate of the at least one CDMA waveform in response to finding the first burst sync; and
   a phase tracking loop for determining signal phase from a second burst, wherein the second burst comprises a preamble adapted to include the first signal frequency estimate.

17. A system as in claim 16 wherein the at least one CDMA waveform comprises:
   at least one QPSK burst data structure, the at least one QPSK burst structure comprising:
      a preamble block, wherein the preamble block comprises:
         a BPSK frame sync code block;
      a payload block, wherein the payload block comprises:
         control data;
         information data; and
         parity data.

18. A system as in claim 17 wherein the at least one CDMA waveform further comprises at least seven QPSK burst data structures.

19. A system as in claim 16 wherein the sync controller comprises:
   a sync calibrator for adjusting sync scale factors and calculating sync threshold in response to the at least one of the plurality of receiver antennas adapted to receive the at least one CDMA waveform, wherein the sync calibrator comprises at least three parallel sync circuits adapted to search a 1½ chip uncertainty range, each sync circuit comprising at least one sync level circuit and at least one sync detect circuit; and
   a sync searcher for aligning burst timing in response to the sync scale factors and sync threshold determined by the sync calibrator.

20. A method for open-loop acquisition of a pseudo-noise (PN) encoded QPSK burst signal, the method comprising the steps of:
   determining at least one PN correlation accumulation (PNCA) threshold;
   determining at least one sync threshold;
   searching for a burst signal synchronization, wherein searching for the burst signal synchronization further comprises the steps of:
   searching a burst preamble;
   detecting a sync word in the burst preamble exceeding the at least one sync threshold;
   in response to detecting the sync word, performing a PNCA of at least 256 bits following the detected sync word;

comparing the PNCA of the at least 256 bits following the detected sync word with the PNCA threshold, wherein the step of comparing further comprises the step of:

in response to the PNCA of the at least 256 bits exceeding the PNCA threshold, verifying the PNCA of at least 256 bits following the detected sync word exceeds the PNCA threshold;

verifying sync word detection;

using the burst preamble to estimate carrier signal frequency; and using a subsequent burst preamble to determine carrier signal frequency and carrier signal phase.

21. A method as in claim 20, wherein the step of determining the at least one PNCA threshold further comprises the steps of:

parallel correlating the PN encoded burst signal with at least one known PN code, wherein the step of parallel correlating further comprises the step of using a length 21 parallel correlator wherein the length 21 parallel correlator exhibits a ½ chip phase difference between each length; and determining an initial sync scale factor.

22. A method as in claim 21 wherein the step of parallel correlating the PN encoded QPSK burst signal with at least one known PN code further comprises the step of parallel correlating during at least one of three equally spaced burst periods occurring within the PN encoded QPSK burst.

23. A method as in claim 21 wherein the step of determining the at least one sync threshold further comprises the steps of:

calculating the at least one sync threshold in response to detecting a BPSK sync pattern embedded in the PN encoded QPSK burst signal; and adjusting the initial sync scale factor.

24. A method as in claim 23 wherein the step of calculating the at least one sync threshold in response to detecting the BPSK sync pattern embedded in the PN encoded QPSK burst signal further comprises the step of parallel detecting the BPSK sync pattern, wherein the step of parallel detecting further comprises the step of using at least three parallel sync detectors phased ½ chip apart.

25. A method to obtain frame acquisition of a received signal, the method comprising:

providing a receiver device operable with a calibration routine to establish a threshold energy level in an immediate channel environment;

receiving at least one pseudo-noise (PN) encoded burst signal having an energy content above the threshold energy level, the at least one PN encoded burst signal being received from a calibration sweep comprised of a plurality of sequential PN encoded burst signals each comprising a preamble portion and a synchronization portion;

executing a parallel correlation on the at least one PN encoded burst signal using at least one known PN code during one of at least three equal duration accumulation periods associated with the at least one PN encoded burst signal; and frame synchronizing using at least a result of the parallel correlation.

* * * * *